United States Patent [19]

Parliment et al.

[11] 4,397,876
[45] Aug. 9, 1983

[54] SEAFOOD FLAVOR

[75] Inventors: Thomas H. Parliment, New City; Denise A. Herzing-Giordano, North Tarrytown, both of N.Y.

[73] Assignee: General Foods Corporation, White Plains, N.Y.

[21] Appl. No.: 318,900

[22] Filed: Nov. 6, 1981

Related U.S. Application Data

[63] Continuation of Ser. No. 921,934, Jul. 3, 1978, abandoned.

[51] Int. Cl.³ .......................................... A23L 1/226
[52] U.S. Cl. ................................................... 426/534
[58] Field of Search ........................................ 426/534

[56] References Cited

PUBLICATIONS

Fenaroli's Handbook of Flavor Ingredients, 2nd Ed., 1975, vol. 2, CRC Press: Cleveland, pp. 578–579.
Arctander, Perfume & Flavor Chemicals, vol. I, 1969, Publ. by the Author: Montclair, N.J., Item No. 1509.

*Primary Examiner*—Joseph M. Golian
*Attorney, Agent, or Firm*—Joseph T. Harcarik; Mitchell E. Alter; Thomas R. Savoie

[57] ABSTRACT

Enhancement of the flavor of foodstuffs is achieved by the addition of cis-4-heptenol. This unsaturated alcohol is represented by the chemical structure:

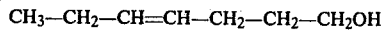

$$CH_3-CH_2-CH=CH-CH_2-CH_2-CH_2OH$$

The flavoring agent imparts a pleasant seafood flavor and aroma to comestibles.

4 Claims, No Drawings

SEAFOOD FLAVOR

REFERENCE TO RELATED APPLICATIONS

This application is a continuation of application Ser. No. 921,934, filed July 3, 1978, now abandoned.

BACKGROUND OF THE INVENTION

1. Field of the Invention

The invention relates to flavor agents in general. More particularly, the invention relates to chemical compounds or compositions which have been found to have utility in the alteration of flavor or flavor characteristics of substances, whether naturally occurring or synthetic. Still more particularly, the invention relates to cis-4-heptenol which has been found useful in the area of flavor-note alteration, whether by the enhancement of flavors or flavor-notes that are characteristic in a substance, by the alteration of a flavor or a flavor-note from a less to a more desirable one, or by the complete or partial masking of a flavor or flavor-note that is characteristic in a substance.

2. Description of the Prior Art

In the field of flavor enhancement, it has been general practice to employ synthetic and naturally isolated compounds and compositions to enhance or mask the flavor of foodstuffs. Generally, isolation of single flavors does not allow one to predict equivalent flavors since compounds of greatly differing structure have been found to produce approximately the same flavor character while compounds of similar structure frequently differ appreciably in taste. Consequently, the identification of desirable flavor components requires synthesis and trial of individual candidates until compounds are identified which have desirable flavors.

For many years, flavor technologists have searched for flavor enhancing compounds which would produce the flavor note generally described by flavor experts as fish or shellfish-like. Recently, a number of fish flavored heptenals have been identified to have this characteristic. In the course of investigating those compounds, we have discovered the compound employed in the composition and process of this invention.

SUMMARY OF THE INVENTION

The general purpose of this invention is to provide a compound which will enhance flavored foodstuffs by imparting to them a flavor characterized by experts as seafood-like. The flavor enhancement is achieved by the addition of a small but effective amount of cis-4-heptenol.

The compound of this invention is stable in foodstuffs as well as being readily soluble in both aqueous and nonaqueous media such as glycerol, propylene glycol, 1,3-butylene glycol, as well as aqueous-based solutions of dry alcohols such as sorbitol and the like, as well as mixtures of the same. This makes the flavoring compound of this invention suitable for dry, semi-moist, and liquid food systems.

It is a further object of this invention to describe processes for preparing and employing compounds useful for enhancing the flavor of foodstuffs. Other objects and advantages of the invention will become apparent in the description and examples herein and after appearing.

DETAILED DESCRIPTION OF THE INVENTION

As is generally recognized by those familiar with the art, the science of flavor technology is an extremely complex one. Although much is known about flavor and flavor technology, there is still a great deal to be learned in the field, and the body of scientific literature is being rapidly expanded by those working in the area. The technology of flavor synthesis and blending of various flavor elements to achieve certain desirable results is of great commercial importance at the present stage of industrial advance. Commercial production of consumer goods from synthetic starting materials is becoming more and more common and desirable as world population continues to increase its demands upon the finite capacity for the production of natural products. Industry is also continually seeking means of upgrading natural products—methods of altering or enhancing the qualities of taste of less desirable natural products—usually more abundant—into more desirable product qualities. Often, for example, a product can be made commercially attractive only by masking or blanking out an undesirable flavor component. Formerly, before the advent of the flavor chemist and his technology, this unit of production would have been lost, or at least, would have had to have been reprocessed to a useable quality. By the use of specifically designed flavoring agents, however, the undesirable flavor note can be eliminated or masked with another desirable one, and the expensive and time-consuming reprocessing step eliminated or the production batch saved for use. Too, it is common in some segments of the industry, particularly the food industry, to add flavor agents to production units to enhance or bring out desirable flavor characteristics of products—and by so doing, to render the product more desirable from a consumer preference standpoint.

The use of cis 4-heptenol as a seafood flavor provides the flavor technologist with additional tools for his use in the alteration of food flavors, whether it be flavor or flavor-note alteration generally or the enhancement or improvement of flavor or flavor notes specifically.

The flavor agent or flavor modifying compound of this invention is available to the food technologists in a variety of forms. It may be in a dry, liquid, or semi-moist form. It is usually preferable to use the agent in the form of a solution, for ease of dilution, exactitude of measurement, efficiency of distribution in the end use, etc. However, the chemical nature of the compound, its solubility in acceptable solvents, its stability, and other characteristics may dictate the form in which it is used.

Foodstuffs in which the incorporation of cis-4-heptenol is contemplated may generally be classified as seafood-like foodstuffs. Such seafood-like foodstuffs comprise those which one skilled in the art would desire to make the prominent flavor or flavor-note that of seafood. By way of explanation and not limitation, these would include seafood analogs such as those produced from textured protein materials, fish and fishmeat alone or in combination with other edibles which themselves may contain the cis-4-heptenol. General examples of the combination of either a seafood analog, fish or fishmeat and other edibles which themselves may contain cis-4-heptenol include: a white source containing cis-4-heptenol in combination with fish; a bouillabaise containing cis-4-heptanol in combination with a seafood analog; and a seasoning composition in combination with fishmeat. Among those textured protein comestibles that are suited for said use are cited in U.S. Pat. Nos. 4,087,566 to Kim et al; U.S. Pat. No. 3,886,299 to Feldbrugge et al; U.S. Pat. No. 3,886,298 to Hayes et al; and M. Gutcho, Textured Foods and Allied Products, 1973, [Publisher: Noyes Data Corporation] which are herein incorporated by reference.

The flavor components of seafood have received little attention. Arctander, in his 1969 publication [Arctander, S., "Perfume and Flavor Chemicals", Vol. 1, Monograph 1509, S. Arctander Publisher, Montclair, N.J. (1969)] refers to cis-4-heptenol as a compound having a very powerful, fruity-green odor. Arctander reports that in dilution, cis-4-heptenol is mostly fruity and rather pleasant but not reproducing any distinctly natural odors. We have found, however, that it has an unmistakable shellfish character at very low levels, a result which is new to the art. Furthermore, according to S. van Straten, F. de Vrijer, and J. C. de Beauveser; Lists of Volatile Compounds in Foods; 3rd Edition, 1973 and Supplement, 1976, the previous occurence of 4-heptenols in food has not been reported.

Cis-4-heptenol is obtained by reduction of cis-4-hepten-1-al. The reactant is commercially available. A reagent is selected that reduces only the carbonyl group yet leaves the carbon-carbon double bond untouched and does not transform isomerize the bond. The preferred reagent is sodium borohydride, $NaBH_4$. Those skilled in the art will immediately recognize that other reducing reagents like lithium aluminum hydride, $LiAlH_4$, may be used. The chemical structure of the product may be confirmed by infra-red analysis and gas chromatograph analysis will provide purity information.

It will be apparent to those skilled in the art that non-appreciable variances from the ranges stated and the minimum concentrations called for in foodstuffs may be made and the same results obtained. It is further appreciated that appreciable deviations from the maximum concentrations in these foodstuffs may be made where a strong shellfish flavor having more prominent fish notes would be desired. It is contemplated that those modifications are appreciated in the above disclosure where the end result in all instances is essentially shellfish flavor.

The threshold level is that quantity of flavoring producing a change in the flavor and aroma of spring water, but a change which cannot be described as a particular flavor. The recognition level is the quantity of flavoring which can be defined as imparting a seafood note to the foodstuff. The threshold flavor level for the compound of this invention is about 0.35 ppm. The recognition of a moderate to high shellfish flavor is evident at about 4 ppm. At very high concentrations, 250 ppm, the flavor of the compound changes and becomes green and fish oil.

Organoleptic evaluation of cis-4-heptenol as a flavoring agent gave the result set out below. Spring water was used to provide a clean starting taste. It is apparent that results obtained conflicted with those of Arctander in that a fruity-green character was not perceived at any level.

| Level, ppm | Evaluation |
| --- | --- |
| 3 | lo, mod. fishy |
| 15 | strong fishy |
| 30 | strong fishy |

| -continued | |
| --- | --- |
| Level, ppm | Evaluation |
| 60 | strong fishy, lobster water, sardine |
| 240 | hi fishy, fish oil, sharp green |
| 500 | oily, fishy |
| 1,000 | fish oil |

The flavor impact of the seafood compound and mixtures thereof is easily adjusted by varying the concentration of the flavoring compounds employed in the foodstuff. It is to be expected that adjustment will be necessary depending on the particular foodstuff being flavored. Initial panel screening, by those of ordinary skill in the art, is used to determine the threshold and proper strength level for the particular foodstuff in which the flavor is to be employed.

The invention is now illustrated but not limited by the following examples:

EXAMPLE I

A typical white sauce according to the present invention can have the following formulation:

| | |
| --- | --- |
| 2 tablespoons butter | 1 cup milk |
| 2 tablespoons flour | ½ teaspoon salt |
| 180 ppm cis-4-heptenol | |

Melt butter and stir in flour; gradually stir in milk, and stir until mixture boils and thickens, then cook about 3 minutes longer, stirring occasionally; add flavorings. Place over hot water to keep hot and cover tightly to prevent crust from forming. Use sauces for fish. Approximate yield: 1 cup sauce.

It has been determined that the optimum level of heptenol in white sauce is from 32 to 320 ppm.

EXAMPLE 2

To prepare a texturized soy protein product having high-oriented, well defined fibers in a fish-like texture, a soy milk is used as a protein source. The soy milk is prepared by soaking 600 grams of soy beans overnight in water, changing the water several times. The soaked beans are then hot ground with boiling water, the water being present at a 10:1 ratio with regard to the soy beans. The resulting slurry is heated to boiling and held there for 15 minutes, and filtered through a double layer of cheesecloth. The residue on the cheesecloth is discarded and the level of solids in the supernatant is determined. The pH of the supernatant is then adjusted to 7.5 using 2 N sodium hydroxide, and an antioxidant is added to the supernatant at a level equivalent to 0.02% of the fat content. Because full fat soy beans are employed, the fat content of the supernatant is about one-fourth the weight of the solids present. The soy bean milk is then placed in an aluminum pan to a depth of about one inch. The pan is placed on a block of dry ice ($-76°$ C.) which extends across the entire bottom surface of the pan. Unidirectional ice crystals, substantially perpendicular to the bottom of the pan, are generated. The mass is completely frozen in about 30 minutes. The frozen mass is then placed in liquid nitrogen for about one minute during which time this shock cooling causes plans of fractures transverse to the direction of alignment of the fibers. The frozen mass is removed from the pan and immersed in 95% ethanol at the weight ratio of 1:4 for 8 hours with stirring at a temperature ranging from −5° to −10° C. The stabilized fibrous material is pressed by applying force perpendicular to the direction of fibers to hasten the release of ethyl alcohol trapped in the spaces between the fibers. The pressed product is then air dried to remove water and residual ethanol. This drying process strengthens the structure. This dried material is autoclaved at 15 psig for 10 minutes to strengthen the structure. The heat set material is then rehydrated by soaking in water containing 200 ppm cis-4-heptanol for about 20 minutes to yield a product having discrete, soft, chewy, fish-like fibers.

The optimum level of cis-4-heptenol is freeze-aligned soy milk is from 30 to 250 ppm.

The above examples and explanations are for the purpose of teaching those skilled in the art how to practice the invention. Upon reading the above disclosure, those skilled in the art will be aware of a number of modifications and variations. It is contemplated that these modifications and variations be included within the scope of the present invention which is defined by the following claims.

We claim:

1. A process for imparting to seafood-like foodstuffs the prominent flavor or flavor-note of seafood which comprises adding to the foodstuff an effective amount of cis-4-heptenol.

2. The process of claim 1, wherein the foodstuff is deficient in seafood flavor.

3. The process of claim 1 wherein the foodstuff is selected from the group consisting of seafood analogs, fish and fishmeat.

4. The process of claim 1 wherein the foodstuff is combined with an edible which contains the cis-4-heptenol.

* * * * *